(12) United States Patent
Wang (10) Patent No.: US 8,196,498 B2
(45) Date of Patent: Jun. 12, 2012

(54) FORMING METHOD FOR APPLYING A CONTINUOUS PUNCHING TO A CHAIN ROLLER

(76) Inventor: Wen-Pin Wang, Tainan Hsien (TW)

( * ) Notice: Subject to any disclaimer, the term of this patent is extended or adjusted under 35 U.S.C. 154(b) by 376 days.

(21) Appl. No.: 12/646,495

(22) Filed: Dec. 23, 2009

(65) Prior Publication Data

US 2011/0146471 A1   Jun. 23, 2011

(51) Int. Cl.
B26D 3/00 (2006.01)
B26F 1/14 (2006.01)

(52) U.S. Cl. .................... 83/49; 83/39; 83/51

(58) Field of Classification Search .......... 83/13, 31–33, 83/27–30, 39–41, 51, 52, 687–689; 470/26, 470/27–33, 197, 18, 87, 89, 25
See application file for complete search history.

(56) References Cited

U.S. PATENT DOCUMENTS

| 3,193,857 | A | * | 7/1965 | Kahn | 470/18 |
| 3,232,156 | A | * | 2/1966 | Fuller | 83/39 |
| 6,237,454 | B1 | * | 5/2001 | Phlipot | 83/13 |
| 6,485,371 | B2 | * | 11/2002 | Sakamura et al. | 470/26 |
| 6,558,263 | B1 | * | 5/2003 | Matsuyama | 470/26 |
| 6,840,866 | B2 | * | 1/2005 | Vogel | 470/19 |
| 7,013,550 | B2 | * | 3/2006 | Shinjo | 29/558 |
| 7,367,893 | B2 | * | 5/2008 | Vrana et al. | 470/25 |
| 7,387,575 | B2 | * | 6/2008 | Babej et al. | 470/25 |
| 7,465,234 | B2 | * | 12/2008 | Keener et al. | 470/6 |
| 2003/0087705 | A1 | * | 5/2003 | Matsuyama | 470/26 |
| 2004/0192452 | A1 | * | 9/2004 | Brun | 470/25 |

* cited by examiner

*Primary Examiner* — Sean Michalski
(74) *Attorney, Agent, or Firm* — Muncy, Geissler, Olds & Lowe, PLLC (57) ABSTRACT

A forming method for applying a continuous punching to a chain roller includes a raw block having a first surface and a second surface. The raw block would be sequentially punched and formed throughout the first to sixth punching or throughout the first to seventh punching. During the fourth punching, a first blanking would be executed. Alternatively, before executing the sixth or the seventh punching, a second blanking would be implemented.

6 Claims, 8 Drawing Sheets

FORMING METHOD FOR APPLYING A CONTINUOUS PUNCHING TO A CHAIN ROLLER

BACKGROUND OF THE INVENTION

1. Field of the Invention

The present invention relates to a forming method for applying a continuous punching to a chain roller with an opening; a height of a chamfer surface of the opening is greater than 0% to 5% of the height of the opening.

2. Description of the Related Art

Figure 8:
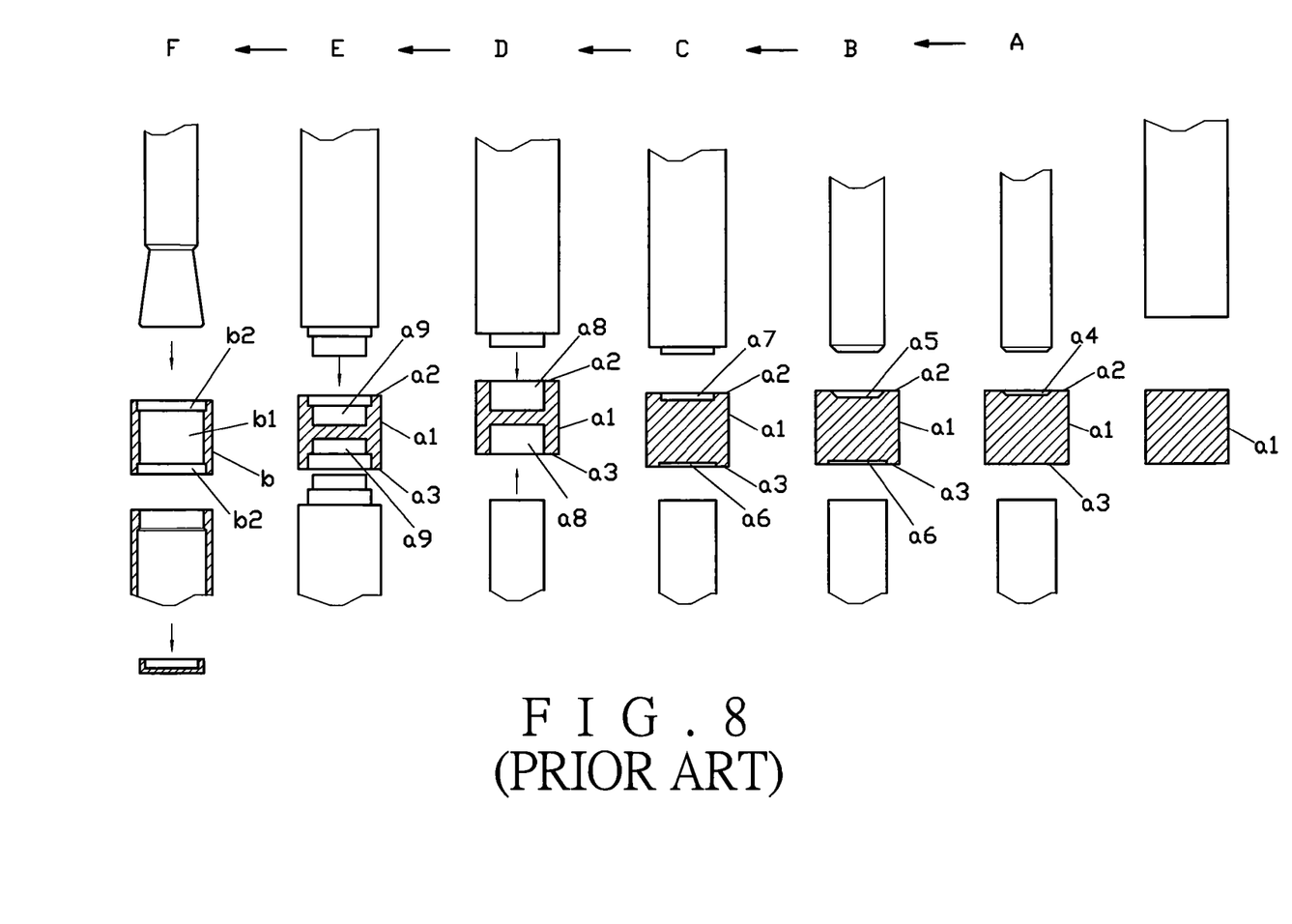
FIG. 8 is a flowchart showing a conventional method for making the chain roller (steps A to F)

FIG. 8 shows a conventional forming method for applying a continuous punching to a chain roller. A raw block (a1) has a first surface (a2) and a second surface (a3). The method comprises the following steps:

A. First punching: the first surface (a2) is punched to form a first chamfering indentation (a4);

B. Second punching: the first surface (a2) is further punched to form a second chamfering indentation (a5) larger than the first chamfering indentation (a4), and the second surface (a3) is punched to form a first square indentation (a6);

C. Third punching: the second chamfering indentation (a5) of the first surface (a2) is punched to form a second square indentation (a7);

D. Fourth punching: the second square indentation (a7) of the first surface (a2) is punched to form a third square indentation (a8), and the first square indentation (a6) of the second surface (a3) is punched to form another third square indentation (a8);

E. Fifth punching: the third square indentations (a8) of the first and second surfaces (a2, a3) are individually punched to form stair indentations (a9); and F. Sixth punching: a middle wall between the two stair indentations (a9) is propelled outside the raw block (a1) via a first blanking to form a chain roller (b) with an aperture (b1).

Wherein, the aperture (b1) of the conventional chain roller (b) has two chamfer surfaces (b2) disposed at two ends thereof. The height of each chamfer surface is defined by 15% of the height of the aperture (b1) (as shown by the step F in FIG. 7); namely, the straight part occupies 70% of the aperture (b1).

Figure 9:
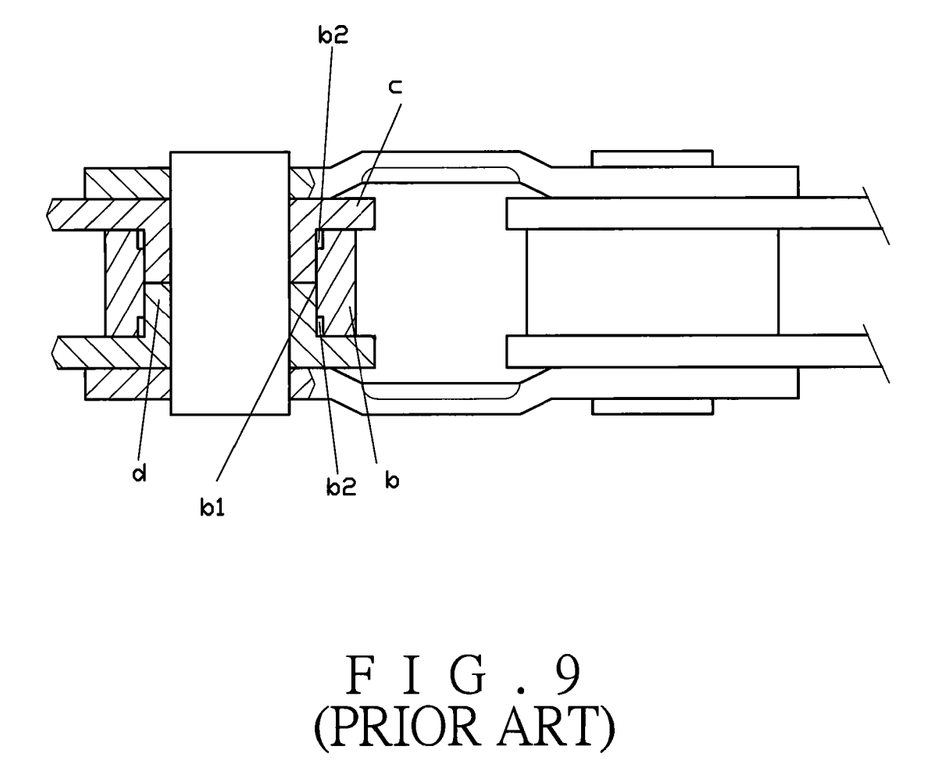
FIG. 9 is a schematic view showing the conventional chain roller applied to a speed shifting bicycle and sustained deformation.

Referring to FIG. 9 shows a speed shifting bicycle. The chain (c) is designed for allowing a speed adjustment of the bicycle, so the chain (c) would suffer for the transformation. Moreover, a chain pin bush (d) and an inner sheet (c1) of the chain (c) are integrally formed. Namely, the chain pin bush (d) is combined by two pieces of the inner sheets (c1) respectively disposed in a moiety, which further cooperate with an outer sheet (c2) to form the chain (c).

However, the conventional forming method adversely incurs the following disadvantages:

1. A distortion readily occurred: when the chain (c) sustains a large torque, the two inner sheets (c1) are easily subjected to deformation.
2. Short using life: the straight part inside the conventional chain roller (b) merely occupies 70% of the aperture (b1), so the chain roller (b) and the chain pin bush (d) have a small contact area, which readily suffers an abrasion and thence decreases the using life.
3. Bumpy speed shifting: practically, the chain (c) habitually deviates rightward or leftward, especially in time of executing the speed changing by cooperating with a gear disk. Whereby, a malposition of the chain (c) would be incurred while upward and downward switching the gear disk. As a result, the chain roller even likely derails, which brings about an inconvenient application.

SUMMARY OF THE INVENTION

It is an object of the present invention to avoid the conventional shortcomings, like an overlarge chamfer surface at two ends of the chain roller, a short using life of the chain pin bush incurred by the abrasion, an over-transformation during the operation, and an inexact location of the chain roller while switching the gear disks.

The forming method in conformity with the present invention comprises a raw block having a first surface and a second surface, and the method thereof includes the following steps:

A. First punching: the first surface of the raw block is punched to form a first chamfering indentation;

B. Second punching: the first chamfering indentation of the first surface is further punched to form a second chamfering indentation larger than the first chamfering indentation; the second surface is punched to form a first square indentation;

C. Third punching: the second chamfering indentation of the first surface is punched to form a second square indentation;

D. Fourth punching: two third square indentations are formed by punching of the first surface and the second surface, respectively, thereby propelling a middle wall between the two third square indentations outside the raw block via a first blanking, so that a first opening having two first chamfer surfaces at two ends thereof is formed;

E. Fifth punching: the first chamfer surfaces disposed at the two ends of the first opening are compressed toward an interior of the first opening to form a stepped hole;

F. Sixth punching: a redundant thickness of the stepped hole is propelled outside the raw block via a second blanking to form a second opening with two second chamfer surfaces; a height of the second chamfer surface is greater than 0% to 5% of a height of the second opening.

In abovementioned method, a height of the first chamfer surface is preferably larger than a height of the second chamfer surface and a diameter of the second opening is larger than a diameter of the first opening.

In abovementioned method, during the sixth punching, a return trip of an upper punching die would preferably scrape an unneeded scrap inside the second opening.

Another forming method in conformity with the present invention comprises a raw block having a first surface and a second surface and the method of the same includes the following steps:

A. First punching: the first surface of the raw block is punched to form a first chamfering indentation;

B. Second Punching: the first chamfering indentation of the first surface is further punched to form a second chamfering indentation larger than the first chamfering indentation; the second surface is punched to form a first square indentation;

C. Third punching: the second chamfering indentation of the first surface is punched to form a second square indentation;

D. Fourth punching: two third square indentations are formed by punching the first surface and the second surface, respectively;

F. Fifth punching: a middle wall between the two third square indentations is propelled outside the raw block via a first blanking, so that a first opening having two first chamfer surfaces disposed at two ends thereof is formed;

F. Sixth punching: the first chamfer surfaces disposed at the two ends of the first opening are compressed toward an interior of the first opening to form a stepped hole;

G. Seventh punching: a redundant thickness of the stepped hole is propelled outside the raw block via a second blanking to form a second opening with two second chamfer surfaces; a height of the second chamfer surface is greater than 0% to 5% of a height of the second opening.

In the aforementioned method, a height of the first chamfer surface is preferably larger than a height of the second chamfer surface and a diameter of the second opening is larger than a diameter of the first opening.

In the aforementioned method, during the seventh punching, a return trip from an upper punching die would preferably scrape an unneeded scrap inside the second opening.

Accordingly, the present invention has the following advantages:

1. The chamfer surfaces disposed at two ends of the opening are each greater than 0% to 5% of the height of the opening. Thus, a larger area for wrapping the chain pin bush is accessible. While applying the corresponding chain roller to a speed shifting bicycle, the chain would be limitedly twisted during shifting the speed. Therefore, the chain would not facilely deviate in time of operation. As a result, the relocation of the chain upon the switching of the gear disks could be more slickly achieved, and a convenient using effect could be preferably accomplished.

2. The straight part occupies at least 90% of the opening. Therefore, a contact area between the opening and the chain pin bush is increased to prevent abrasion thereof. Whereby, the using life of the chain could be accordingly promoted.

DETAILED DESCRIPTION OF THE PREFERRED EMBODIMENTS

Figure 1:
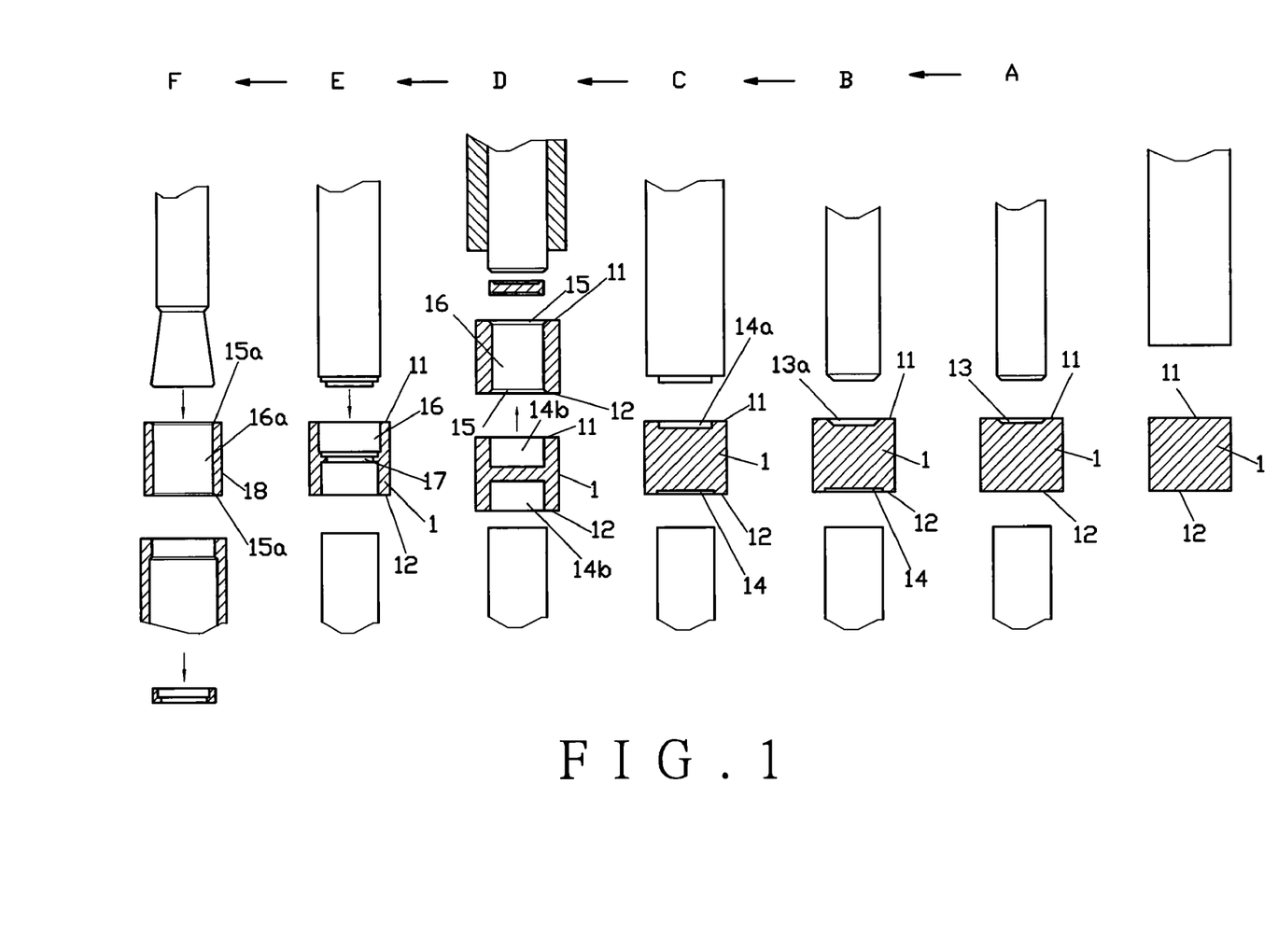
FIG. 1 is a flowchart showing a first preferred embodiment of the present invention (steps A to F)
Figure 2:
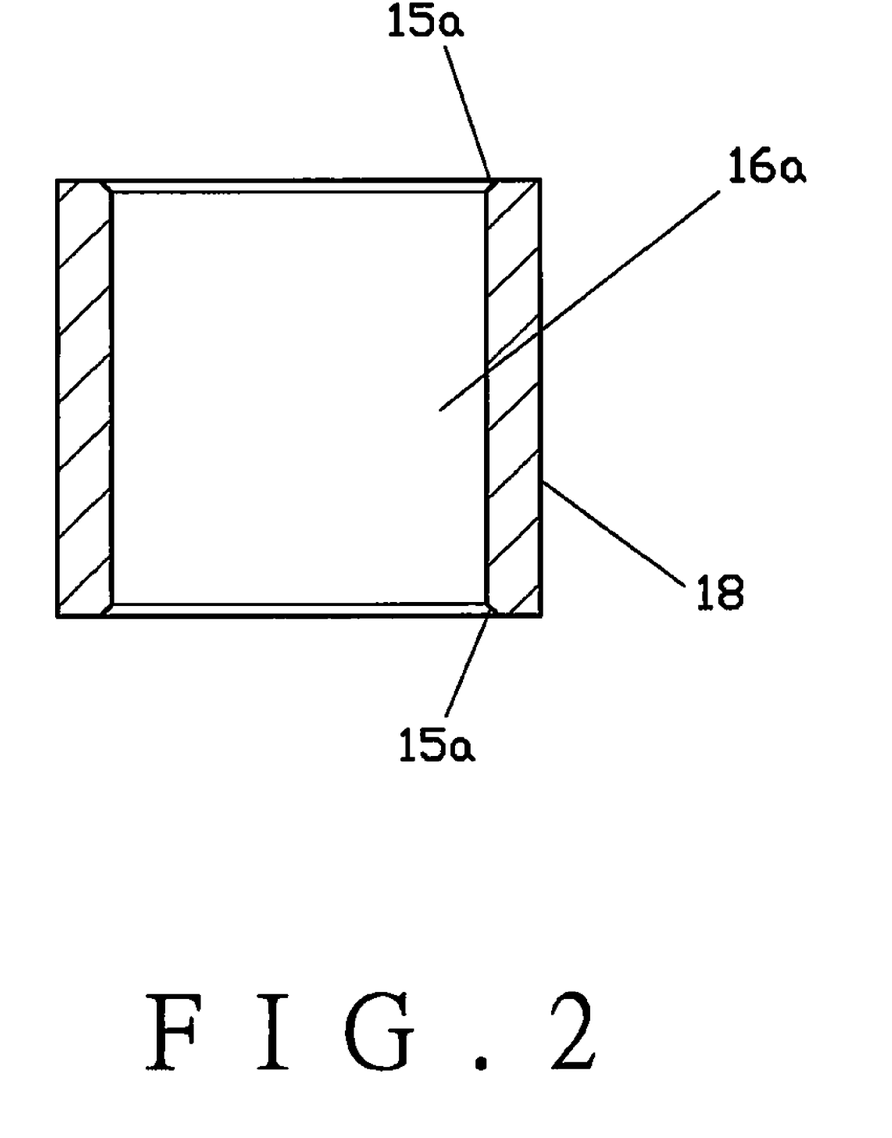
FIG. 2 is a cross-sectional view showing a chain roller made according to the method of the first preferred embodiment.

FIGS. 1 and 2 show a forming method for applying a continuous punching to a chain roller. Wherein, a raw block (1) has a first surface (11) and a second surface (12). The forming method in conformity with a first preferred embodiment of the present invention includes steps of:

A. First punching: the first surface (11) of the raw block (1) is punched to form a first chamfering indentation (13);

B. Second punching: the first chamfering indentation (13) of the first surface (11) is further punched to form a second chamfering indentation (13a) larger than the first chamfering indentation (13); the second surface (12) is punched to form a first square indentation (14);

C. Third punching: the second chamfering indentation (13a) of the first surface (11) is punched to form a second square indentation (14a);

D. Fourth punching: two third square indentations (14b) are formed by punching the first surface (11) and the second surface (12), respectively, thereby propelling a middle wall between the two third square indentations (14b) outside the raw block (1) via a first blanking, so that a first opening (16) provided with two first chamfer surfaces (15) respectively disposed at two ends thereof is formed;

E. Fifth punching: the first chamfer surfaces (15) disposed at the two ends of the first opening (16) are compressed toward an interior of the first opening (16) to form a stepped hole (17);

F. Sixth punching: a redundant thickness of the stepped hole (17) is propelled outside the raw block (1) via a second blanking to form a second opening (16a) with two second chamfer surfaces (15a); a height of the second chamfer surface (15a) is greater than 0% to 5% of a height of the second opening (16a) of a chain roller (18) as shown in FIG. 2.

A height of the first chamfer surface (15) is larger than a height of the second chamfer surface (15a) and a diameter of the second opening (16a) is larger than a diameter of the first opening (16).

Different upper/lower punching dies are suitably and respectively applied from the first punching through the sixth punching and the shapes of dies may be varied in accordance with the needed punching shapes. The corresponding shapes in the embodiments are herein illustrated in the FIG. 1. The similar correlations are herein omitted.

During the sixth punching, a return trip from an upper punching die would scrape an unneeded scrap inside the second opening (16a). Thereby, a preferable straightness and precision inside the second opening (16a) could be accomplished.

Figure 3:
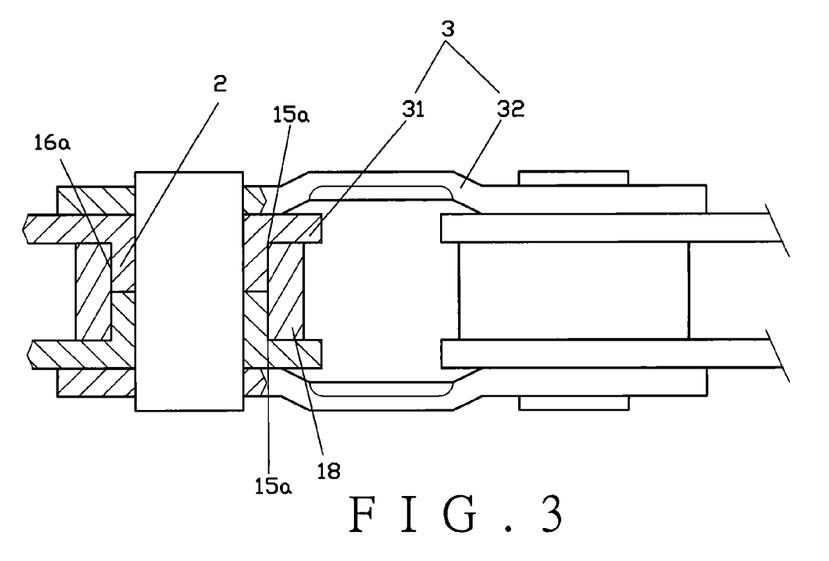
FIG. 3 is a schematic view showing the chain roller and a chain pin bush.
Figure 4:
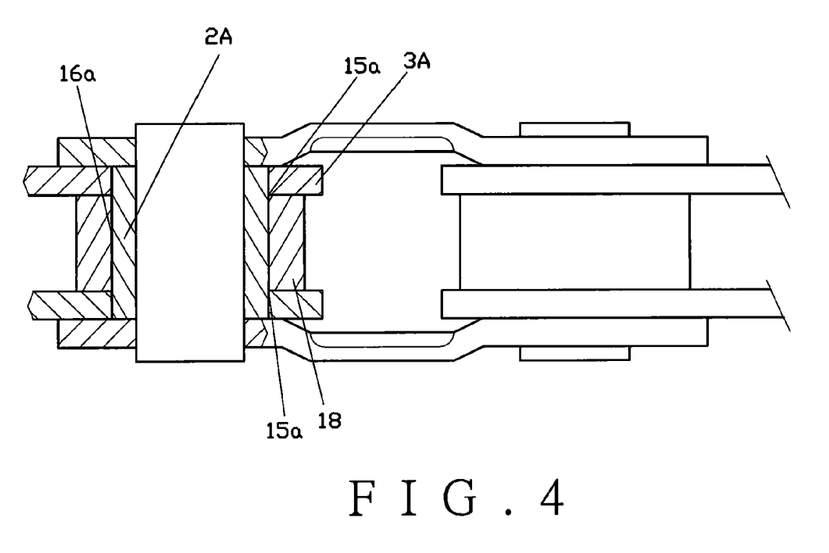
FIG. 4 is another schematic view showing the chain roller and the chain pin bush.
Figure 5:
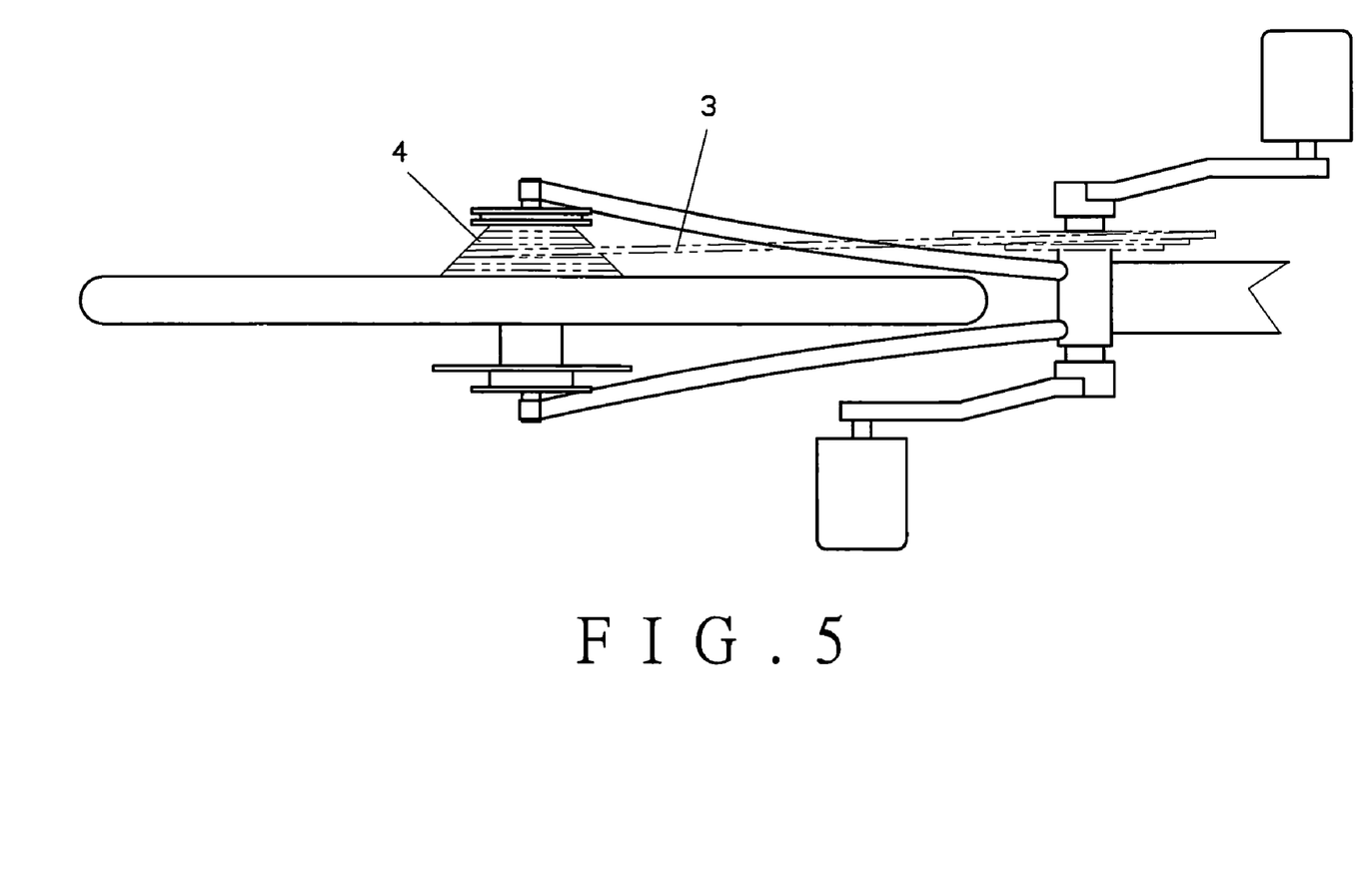
FIG. 5 is schematic view showing the chain applied to a speed shifting bicycle and sustained deformation.

Referring to FIGS. 3 and 4, the straight part occupies 95% to 100% of the second opening (16a) (as shown in FIG. 2) of the integral chain roller. Accordingly, a contact area between a chain (3) and chain pin bushes (2, 2A) would be larger to favorably decrease the possibility of abrasion. Thereby, the using life of the chain (3) could be promoted. Moreover, in view of the chain pin bushes (2, 2A) are more widely wrapped, the deformation thereof can be preferably avoided. For an explicit explanation, the present invention can be especially applied to a speed shifting bicycle as shown in FIG. 3, wherein, the chain pin bush (2) as well as an inner sheet (31) of the chain (3) would be integrally formed on the speed shifting bicycle. Further, the chain pin bush (2) is combined by two halves of inner sheets (31), and an outer sheet (32) would further cooperate therewith to form the chain (3). Whereby, when the chain (3) sustains a large torque and transforms, the chain pin bush (2) would be prevented from deformation as a result of the larger wrapping area. In addition, FIG. 5 shows to adapt the present invention to the chain (3A) of the speed shifting bicycle and shows the transformation thereof. Wherein, in time of adjusting the speed, the distortion of the chain (3) would be restrained to further decrease the potential deviation on the chain (3) while operating. As a result, it would be smoother to shift the chain (3) on gear disks (4) by an exact position, and the practical application would be more convenient.

Figure 6:
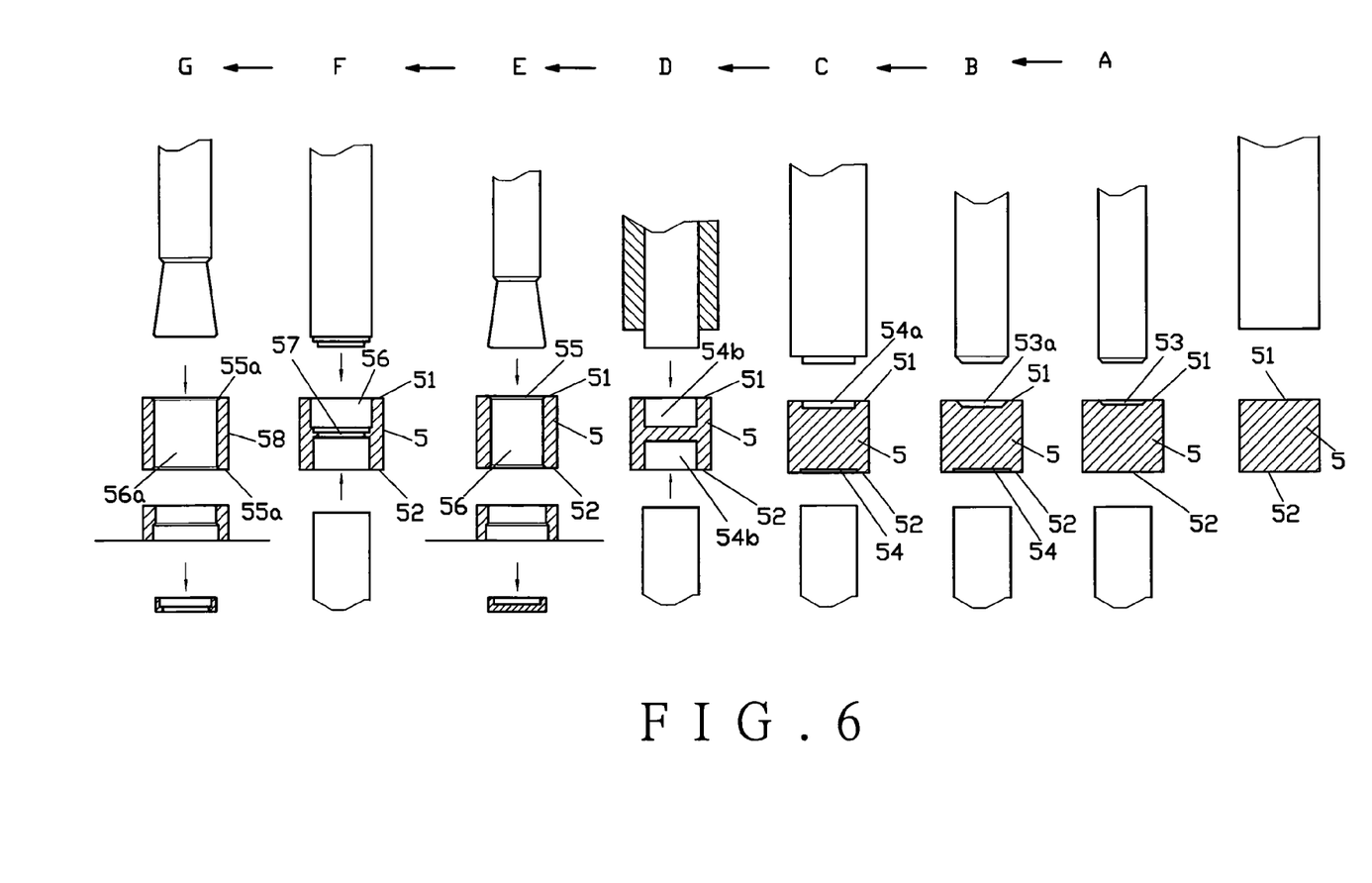
FIG. 6 is a flowchart showing a second preferred embodiment of the present invention (steps A to G)
Figure 7:
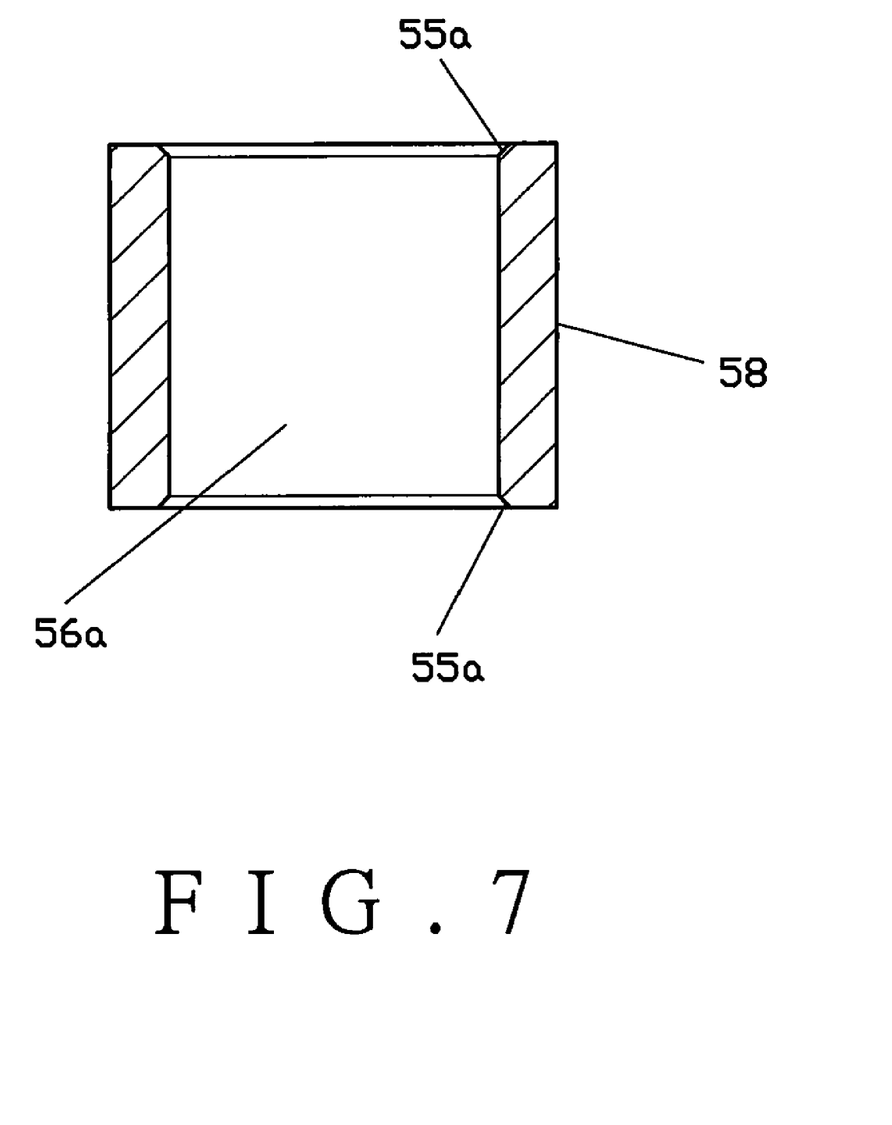
FIG. 7 is a cross-sectional view showing the chain roller made according to the method of the second preferred embodiment.

FIG. 6 shows a second preferred embodiment of the present invention. A raw block (5) has a first surface (51) and a second surface (52), and the method in conformity with the present invention includes the following steps:

A. First punching: the first surface (51) of the raw block (5) is punched to form a first chamfering indentation (53);
B. Second punching: the first chamfering indentation (53) of the first surface (51) is further punched to form a second chamfering indentation (53a) larger than the first chamfering indentation (53); the second surface (52) is punched to form a first square indentation (54);
C. Third punching: the second chamfering indentation (53a) of the first surface (51) is punched to form a second square indentation (54a);
D. Fourth punching: two third square indentations (54b) are formed by punching the first surface (51) and the second surface (52), respectively;
E. Fifth punching: a middle wall between the two third square indentations (54b) is propelled outside the raw block (5) via a first blanking, so that a first opening (56) with two first chamfer surfaces (55) respectively disposed at two ends thereof is formed;
F. Sixth punching: the first chamfer surfaces (55) disposed at the two ends of the first opening (56) are compressed toward an interior of the first opening (56) to form a stepped hole (57);
G. Seventh punching: a redundant thickness of the stepped hole (57) is propelled outside the raw block (5) via a second blanking to form a second opening (56a) with two second chamfer surfaces (55a); a height of the second chamfer surface (55a) is greater than 0% to 5% of a height of the second opening (56a) in a chain roller (58) as shown in FIG. 7.

Different upper/lower punching dies are suitably and respectively applied from the first punching through the seventh punching and the shapes of dies may be varied in accordance with the needed punching shapes. The corresponding shapes in the embodiments are illustrated in the FIG. 6. The similar correlations are herein omitted.

During the seventh punching, a return trip from an upper punching die would scrape an unneeded scrap inside the second opening (56a), so that a straightness and precision inside the second opening (56a) could be more preferably achieved.

Further, the chain rollers (18, 58) applied in the first and second embodiments are shaped similarly with comparable operating manners as well as advantages, so the known techniques related thereto are herein omitted.

I claim:

1. A method for applying a continuous punching to a chain roller; wherein, a raw block having a first surface and a second surface; said method comprising steps of:
    a first punching: said first surface of said raw block being punched to form a first chamfering indentation;
    a second punching: said first chamfering indentation of said first surface being further punched to form a second chamfering indentation larger than said first chamfering indentation; said second surface being punched to form a first square indentation;
    a third punching: said second chamfering indentation of said first surface being punched to form a second square indentation;
    a fourth punching: two third square indentation being formed by punching said first surface and said second surface, respectively, thereby propelling a middle wall between the two third square indentations outside said raw block via a first blanking, so that a first opening having two first chamfer surfaces respectively disposed at two ends thereof being formed;
    a fifth punching: said first chamfer surfaces disposed at said two ends of said first opening being compressed toward an interior of said first opening to form a stepped hole; and
    a sixth punching: a redundant thickness of said stepped hole being propelled outside said raw block via a second blanking to form a second opening with two second chamfer surfaces; a height of each said second chamfer surface being greater than 0% to 5% of a height of said second opening.

2. The method as claimed in claim 1, wherein, a height of said first chamfer surface is larger than a height of said second chamfer surface and a diameter of said second opening is larger than a diameter of said first opening.

3. The method as claimed in claim 1, wherein, during said sixth punching, a return trip from an upper punching die scrapes an unneeded scrap inside said second opening.

4. A method for applying a continuous punching to a chain roller; wherein, a raw block having a first surface and a second surface; said method comprising steps of:
    a first punching: said first surface of said raw block being punched to form a first chamfering indentation;
    a second punching: said first chamfering indentation of said first surface being further punched to form a second chamfering indentation larger than said first chamfering indentation; said second surface being punched to form a first square indentation;
    a third punching: said second chamfering indentation of said first surface being punched to form a second square indentation;
    a fourth punching: two third square indentations being formed by punching said first surface and said second surface, respectively;
    a fifth punching: a middle wall between two the third square indentations being propelled outside said raw block via a first blanking, so that a first opening having two first chamfer surfaces respectively disposed at two ends thereof being formed;
    a sixth punching: said first chamfer surfaces disposed at said two ends of said first opening being compressed toward an interior of said first opening to form a stepped hole; and
    a seventh punching: a redundant thickness of said stepped hole being propelled outside said raw block via a second blanking to form a second opening with two second chamfer surfaces; a height of said second chamfer surface being greater than 0% to 5% of a height of said second opening.

5. The method as claimed in claim 4, wherein, a height of said first chamfer surface is larger than a height of said second chamfer surface and a diameter of said second opening is larger than a diameter of said first opening.

6. The method as claimed in claim 4, wherein, during said seventh punching, a return trip from an upper punching die scrapes an unneeded scrap inside said second opening.

* * * * *